United States Patent Office 2,984,459
Patented May 16, 1961

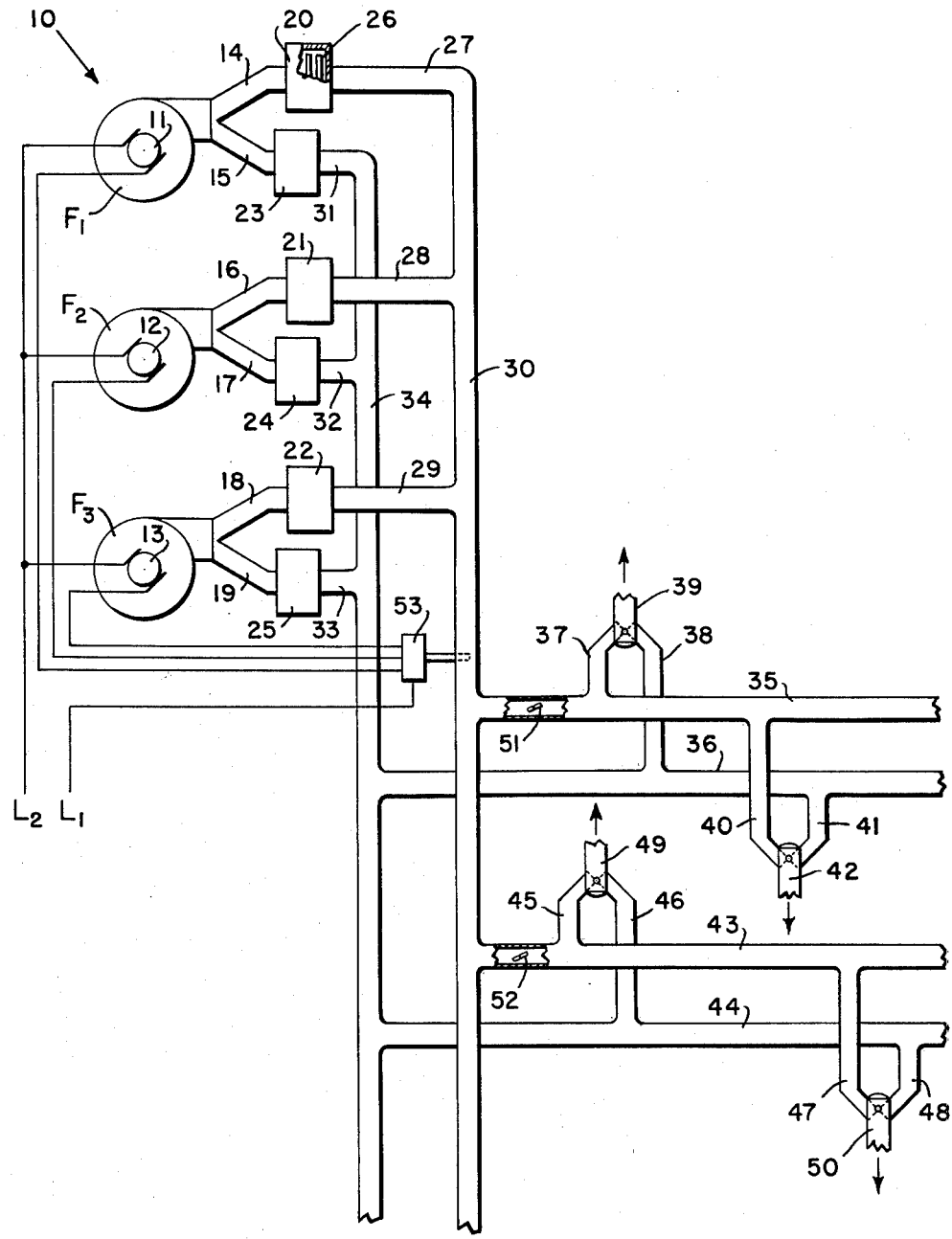

2,984,459

AIR CONDITIONING

Robert W. Waterfill, Montclair, N.J., assignor, by mesne assignments, to Buensod-Stacey Corporation, a corporation of Ohio Filed Aug. 2, 1957, Ser. No. 675,888

3 Claims. (Cl. 257—283)

The present invention relates to dual duct air conditioning systems, and particularly to large capacity systems for multi-room office buildings and the like.

When large office buildings are air conditioned from a dual duct central installation, it quite often happens that air conditioning may be required in some limited area or areas of the building only. For example, at nighttime, heating may be required in the perimeter area only of the building. If the fan means of the central installation could be used or controlled selectively to supply conditioned or heated air only to the areas requiring it, fan horsepower economy could be greatly increased, only one, or the required number of fans or fan capacity being used when it or they have sufficient capacity to supply the demand. One way to effect this horsepower economy is to install separate warm and cool air ducts from the central installation to each room or zone within the building to be conditioned. In this way, unneeded air, such as the cool or warm air supply, can be shut off from any zone needing only warm or cool air. This sort of installation may be prohibitive in initial cost and in conventional dual duct systems, conditioned air is circulated to inactive areas of the building not requiring conditioning, thereby greatly reducing fan horsepower economy of the system.

One of the objects of this invention is to provide a central dual duct air conditioning system for large buildings and the like wherein great economies are effected in fan horsepower.

Another object of the invention is to provide a dual duct air conditioning system that will circulate conditioned air only to those areas within a large building that call for conditioned air without providing separate ducts from a central installation to each room or zone of the building.

One aspect of the present invention is to provide flexible fan capacity means for supplying air to the main distributing ducts of a dual duct central system and a pressure responsive control circuit, or suitable means, for maintaining active as much of the fan capacity as is required to supply all of the conditioned air at a predetermined pressure needed by any or all areas of the building. In one form, a plurality of fans can be used. From the main warm and cool air ducts many auxiliary warm and cool air ducts can extend to supply conditioned air to large sections of the building being conditioned, and from the auxiliary or zone ducts, many individual small area or room conditioning ducts may extend. These latter individual warm and cool air ducts may terminate in air distributing units which may include a mixing valve having condition responsive dampers therein for blending the warm and cool air to the requirements dictated by condition responsive means in each room or small area being conditioned.

By locating a damper in each of the cool air auxiliary or zone ducts leading from the main cool air duct, whole sections of the building can be cut out of the cool or warm air side of the system. When whole sections of the building are cut out by manually or otherwise closing of one or more dampers in one or more of the cool air auxiliary or zone ducts, an increase in pressure of the air within the main cool air duct occurs. Pressure responsive means may be incorporated within the duct for successively de-energizing and energizing the fan motors as variations in pressure occur to the end that an optimum air pressure is maintained within the system. Manual means also may be employed or a shut-off could be placed in the warm air duct. Closing of the cool air damper in its air duct will automatically cause each of the mixing units fed by the auxiliary duct to respond and effect closing of its corresponding warm air valve in accordance with the zone or room demand, thereby eliminating the need for a damper in the warm air duct corresponding to the damper in the cool air auxiliary duct.

Although the principles of the present invention are equally applicable to low pressure systems, they are particularly suitable in high pressure systems where relatively smaller sized ducts may be used to supply conditioned air throughout a large building. For example, ducts having maximum diameters of about two inches to fourteen inches, or its equivalent, can be used in high pressure systems with static pressures usually exceeding approximately two inches of water and with the potential velocity of air in the main supply ducts between about 1,500 and 3,500 feet per minute, although these values may vary slightly from those given in what is known as a high pressure system.

Thus, the invention involves a system that does not change the normal daytime operation of the air conditioning system. It can be used mostly nights or weekends. For instance, during the heating season it is not necessary to maintain full air circulation at night in unoccupied areas. Interior zones may need little or no heat, exterior zones will need some heat, neither will need recirculated or cool air. The thermostats will simply vary the volume of warm air to unoccupied spaces to maintain minimum temperatures. If some isolated areas are occupied, the cold air supply to that zone will remain open for normal operation. Thus, the dampers can be arranged to shut off cool air to (1st) zones requiring no cooling at night and (2nd) to permit any zone working overtime to obtain normal conditioning without necessitating complete conditioning of the unoccupied building.

The above as well as other objects of the invention will become apparent from the following description and accompanying drawing which is merely exemplary.

In the drawing:

The figure is a schematic diagram of a central dual duct air conditioning system to which the principles of the invention have been applied.

Referring to the drawing, a central conditioning apparatus generally indicated at 10 comprises a plurality of fans $F_1$, $F_2$ and $F_3$ that are individually driven by separate electric motors 11, 12 and 13. In the embodiment disclosed only three such fans are shown although any number can be employed, depending upon the size of the installation to which the principles of the invention are applied. Other flexible fan or air supply means can be provided.

The fans $F_1$, $F_2$ and $F_3$ may be provided with divided supply ducts 14, 15; 16, 17; and 18, 19, respectively. Each of the ducts 14, 16 and 18 leads into suitable cooling devices 20, 21 and 22; while each of the ducts 15, 17 and 19 leads into heating devices 23, 24 and 25. The cooling devices 20, 21 and 22 may include coils 26 through which cooling fluid flows at a predetermined temperature as shown and described in Patent No. 2,747,842 granted May 29, 1956. Likewise, each of the heating devices 23, 24 and 25 operates substantially in the same manner as the heating device operates in the above referred to patent. Separate cooling devices are not necessary but in such an instance, in the case of a single heat exchanger, a back draft damper would be required to shut off from the heat exchanger any fan not operating.

The outlets of the cooling devices 20, 21 and 22 are connected through ducts 27, 28 and 29 to a main cool air duct 30 that may lead in a general pattern throughout the building being conditioned. From this main cool air duct 30, auxiliary or zone cool air ducts may extend in a more specific pattern to sections of the building having somewhat the same conditioning demands, and from the latter still other ducts may extend to rooms or zones to be treated, as will be described later. The outlets of the heating devices 23, 24 and 25 are connected through ducts 31, 32 and 33 to a main warm air duct 34 that may lead, like duct 30, in a general pattern throughout the building being conditioned, and from which other ducts may extend in the same manner as described with respect to the main cool air duct 30.

Accordingly, auxiliary or zone cool and warm air ducts 35 and 36 may lead from the main cool and warm air ducts 30 and 34, and they may extend in a specific pattern throughout one section of the building being conditioned. From the zone ducts 35 and 36, individual room or zone conditioning ducts 37 and 38 may extend to a specific location. These ducts 37 and 38 may terminate in a temperature responsive mixing valve 39 of the type shown, described and claimed in co-pending application Serial No. 665,163 filed June 12, 1957.

From the mixing valve 39, the mixed air is fed to the room or zone of the building being treated. Additional ducts 40, 41 lead from the auxiliary ducts 35 and 36, and they terminate in another mixing valve 42 that may be the same as valve 39.

Additional auxiliary or zone cool and warm air ducts 43 and 44 may lead from the main cool and warm air ducts 30 and 34 and extend in a specific pattern throughout another section of the building being conditioned. From auxiliary ducts 43 and 44, many ducts such as ducts 45, 46, 47 and 48, may lead to mixing valves 49 and 50 in the same manner that ducts 37 and 38 lead to mixing valve 39.

Usually, the pattern of the auxiliary ducts 35, 36 and 43, 44 is such that they supply sections requiring somewhat the same conditioning loads. Thus, the auxiliary ducts 35, 36 and the like could cover a central area of the building, while zone ducts 43, 44 and the like could cover a perimeter area of the building. In this way, while the heating and cooling demands of auxiliary ducts 35, 36 might be different from the demands of ducts 43, 44, yet the demands of the individual room or small area ducts such as 37, 38, 40 and 41 could be somewhat alike, and the demands of those such as 45, 46, 47 and 48 could also be somewhat alike, but different from the demands of ducts 37, 38, 40 and 41.

It has been found that in such a system as above outlined, the location of valves or dampers 51 and 52 within the cool air zone ducts 35 and 43 can effect substantial fan horsepower economies. Although the dampers 51 and 52 may be automatically opened and closed, they are preferably manually operated when it is desired to cut off conditioning to the sections of the building served by their corresponding auxiliary cool air duct. The damper 51 is preferably located between the main cool air duct 30 and the first zone cool air duct 37 so that all such zone cool air ducts that extend from the auxiliary duct 30 are affected by the operation of the valve or damper 51. In the same manner, damper 52 is located in auxiliary duct 43. Since the mixing valves 39, 42, 49 and 50 each may include a thermostatically controlled balanced damper, it is evident that no valves or dampers corresponding to dampers 51 and 52 are required in the warm air auxiliary ducts 36 and 44.

In order to effect fan horsepower economy when one or more valves or dampers 51 and 52 are closed, pressure responsive switch means 53 may be provided. Such means may include a Pitot tube, or other pressure responsive means, extending into the stream of cool air within the main cool air duct 30. The switching means 53 may take any one of many commercial forms and may include contact means for each of the motors that drive fans $F_1$, $F_2$ and $F_3$. Such a device will, when the pressure of the air within duct 30 is below optimum pressure, energize the motors 11, 12 and 13 for all of the fans $F_1$, $F_2$ and $F_3$. As the pressure within duct 30 increases due to the closing of one or more of the dampers 51 or 52, the switch device 53 will cut out first one then another of the motors 11, 12, and 13 until the optimum pressure within the system is restored.

Although the various features of the new and improved dual duct air conditioning system have been shown and described in detail to fully disclose one embodiment of the invention, it will be evident that numerous changes may be used without others without departing from the principles of the invention.

What is claimed is:

1. In a dual duct air conditioning system including a plurality of fans for supplying the system with sufficient air to meet the maximum demands of the system, a separate motor for driving each of said fans; a cooling and heating device for each of said fans through which the air from the respective fan is adapted to pass; separate main cool and warm air ducts into which air from all of said cooling and heating devices passes; pairs of separate auxiliary cool and warm air ducts, each pair leading, respectively, from said main cool and warm air ducts; a plurality of pairs of individual zone cool and warm air ducts each of which lead, respectively, from said auxiliary cool and warm air ducts and terminate in a theromstatically controlled air mixing valve; means located in the auxiliary cool air duct of each pair of auxiliary ducts between the main cool air duct and the first downstream individual cool air duct for restricting the passage of air therethrough; and means for separately energizing each of said motors to operate the respective fan in accordance with supply requirements.

2. In a dual duct air conditioning system for a relatively large multi-room building, main cool and warm air ducts; a plurality of fans for supplying conditioned air to said main cool and warm air ducts; a separate motor for driving each of said fans; pairs of separate auxiliary cool and warm air ducts connected, respectively, to said main cool and warm air ducts and leading to a section of said building where the air conditioning demands are not materially affected by sudden changes in outside temperature; other pairs of separate auxiliary cool and warm air ducts connected, respectively, to said main cool and warm air ducts and leading to a section of said building where the air conditioning demands are affected by sudden changes in outside temperature; means for restricting the passage of air through the auxiliary cool air duct of each pair leading to that section of the building not materially affected by sudden changes in outside temperature; a plurality of pairs of individual zone cool and warm air ducts leading from each of said auxiliary cool and warm air ducts, each pair terminating in a thermostatically controlled mixing valve; said restricting means being located between the main cool air duct and the first downstream individual cool air duct leading from the respective auxiliary cool air duct; and means responsive to the increased pressure in said main cool air duct due to said restricting means for separately controlling the energizing of each of said motors to maintain the pressure within said main cool air duct at a predetermined value.

3. In a dual duct air conditioning system including a plurality of fans for supplying the system with sufficient air to meet the maximum demands of the system, a separate motor for driving each of said fans; separate main cool and warm air ducts connected to the outlets of each of said fans; a plurality of pairs of auxiliary cool and warm air ducts leading, respectively, from said main cool and warm air ducts; a plurality of pairs of individual zone cool and warm air ducts leading from each of said auxiliary cool and warm air ducts, each pair terminating in a thermostatically controlled mixing valve; valve means located in each of the auxiliary cool air ducts between its connection to the main cool air duct and the first downstream zone cool air duct; and means responsive to the pressure within said main cool air duct for separately controlling the energizing of each of the motors to operate the respective fan.

References Cited in the file of this patent

UNITED STATES PATENTS

| | | |
|---|---|---|
| 2,223,287 | Kingsland | Nov. 26, 1940 |
| 2,479,069 | Hallinan | Aug. 16, 1949 |
| 2,508,749 | Denis | May 23, 1950 |
| 2,609,183 | Fitzgerald | Sept. 2, 1952 |
| 2,708,568 | Marshall | May 17, 1955 |
| 2,747,842 | Shataloff | May 29, 1956 |
| 2,756,026 | Myrent et al. | July 24, 1956 |